C. H. RHODES.
LOOSE PULLEY.
APPLICATION FILED JULY 24, 1917.

1,322,617.

Patented Nov. 25, 1919.

WITNESSES

INVENTOR
CHARLES H. RHODES,
BY
ATTORNEYS

UNITED STATES PATENT OFFICE.

CHARLES H. RHODES, OF OWOSSO, MICHIGAN.

LOOSE PULLEY.

1,322,617.  Specification of Letters Patent.  Patented Nov. 25, 1919.

Application filed July 24, 1917. Serial No. 182,384.

*To all whom it may concern:*

Be it known that I, CHARLES H. RHODES, a citizen of the United States, and a resident of Owosso, in the county of Shiawassee and State of Michigan, have invented new and useful Improvements in Loose Pulleys, of which the following is a specification.

My invention is an improvement in loose pulleys, and the invention has for its object to provide mechanism in connection with the loose pulley for lubricating the same during the running of the pulley.

Figure 1:
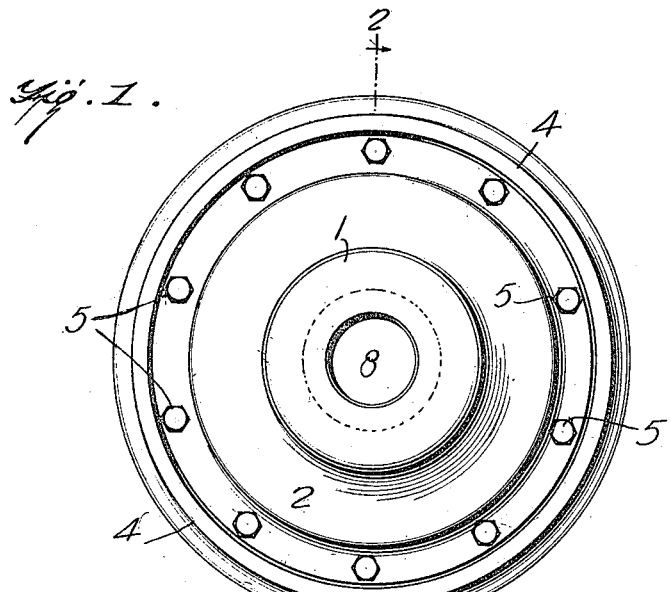
Figure 1 is an end view of the improved pulley.

In the present embodiment of the invention, a pulley is provided, consisting of similar hub sections 1, which are adapted to be in line and coaxial to form a complete hub, and the said hub sections have radial ribs 2 near their inner ends, which are spaced apart when the sections are connected. Each of these ribs has it outer edge 3 offset inwardly to abut the other section, to hold the adjacent ends of the sections spaced apart, and to form an annular chamber between the ribs 2 communicating with the interior of the hub through the space between the sections.

A suitable rim 4 is connected between the offset portions 3 by means of screw bolts 5 which pass through the said offset portion and a rib 6 on the rim and have threaded engagement with an offset portion. It will be evident that rims or shells of different diameter may be connected with the offset portions 3 of the ribs by providing ribs 6 of different widths.

The inner faces of the sections 1 are annularly recessed, as shown at 7, and a bushing 8 is arranged within these recesses, the said bushing engaging at its ends with the ends of the recess. This bushing is intended to be secured to the shaft upon which the pulley is mounted, and the pulley turns on the bushing. The bushing has a longitudinally extending passage 9 in its wall, and a tube 10 leads from this passage radially, extending through and moving in the space between the ends of the sections. It will be noticed that the outer end of the tube is bent angularly, as shown at 11, in the direction opposed to that toward which the pulley rotates. A filling opening 12 is provided in the annular chamber 13 formed between the ribs, and this opening is normally closed by a threaded plug 14.

Figure 3:
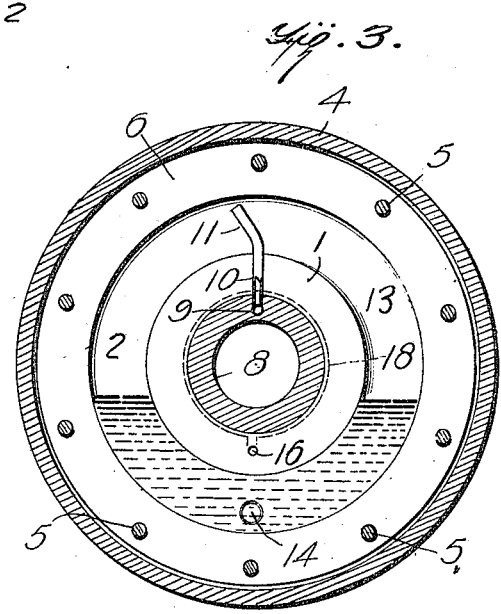
Fig. 3 is a section on the line 3—3 of Fig. 2, both views looking in the direction of the arrows adjacent the line.

The lubricant, when the pulley is not running, occupies the position shown in Fig. 3 filling the chamber 12 to about the level of the bottom of the opening through the bushing. When the pulley is rotated, the lubricant is thrown outward by centrifugal force, taking a position against the outer wall of the annular chamber, and the bent end 11 of the tube 10 will move in the lubricant as the pulley rotates.

Figure 2:
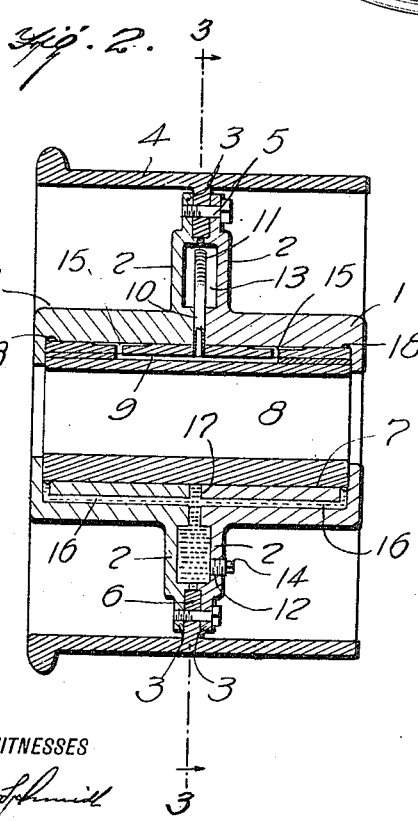
Fig. 2 is a section on the line 2—2 of Fig. 3.

The lubricant will be forced through the tube into the passage 9, and toward the ends of the said passage and outwardly through the radial openings indicated at 15, to the contacting surfaces of the hub and the bushing. It will be noticed from an inspection of Fig. 2 that the bushing is annularly recessed at the opening 15 and the lubricant passing down around the bushing will enter passages 16 extending from the ends of the recess for the bushing and extending toward the center of the hub, where they communicate with a radial passage 17 leading to the annular passage 13. It will be noticed, by referring to Fig. 2, that the interior of the hub has annular recesses 18 which register with the ends of the passage 16.

I claim:

A pulley comprising a hub portion, a rim, and a web connecting the hub and rim, said web having formed therein an annular chamber adapted to contain lubricant, a bushing disposed within said hub and revoluble with respect thereto, said bushing being provided with a longitudinally extending passage having formed at its ends radial passages extending to the outer periphery of the bushing, said bushing being provided on its outer periphery at the ends of said radial passages with circumferential grooves, a tube connected and communicating with said longitudinal passage and extending into said annular chamber, said hub being provided with a longitudinlly extending passage having its ends extending radially inwardly to the outer periphery of said bushing adjacent the ends thereof, the internal periphery of said hub being provided at the ends of said bushing with annular grooves communicating with the radial ends of said last named passage, and said hub being further provided at its center with a radial passage communicating with said last named passage and said annular lubricant containing chamber and extending to the outer periphery of said bushing.

CHARLES H. RHODES.